United States Patent
Iwamoto et al.

(10) Patent No.: US 8,075,992 B2
(45) Date of Patent: Dec. 13, 2011

(54) PERFLUOROELASTOMER ARTICLES HAVING GOOD SURFACE PROPERTIES

(75) Inventors: Kaori Iwamoto, Utsunomiya (JP); Bunichi Rai, Tokyo (JP); Shinichi Sogo, Tsuduki-ku (JP)

(73) Assignee: DuPont Performance Elastomers LLC, Wilmington, DE (US)

(*) Notice: Subject to any disclaimer, the term of this patent is extended or adjusted under 35 U.S.C. 154(b) by 549 days.

(21) Appl. No.: 12/074,391

(22) Filed: Mar. 4, 2008

(65) Prior Publication Data

US 2008/0154003 A1    Jun. 26, 2008

Related U.S. Application Data

(62) Division of application No. 11/208,187, filed on Aug. 19, 2005, now abandoned.

(60) Provisional application No. 60/607,103, filed on Sep. 3, 2004.

(51) Int. Cl.
   *C08F 16/24* (2006.01)
(52) U.S. Cl. ........ 428/336; 428/422; 526/247; 526/250; 427/372.2
(58) Field of Classification Search .................. 428/336, 428/422; 526/247, 250; 427/372.2
   See application file for complete search history.

(56) References Cited

U.S. PATENT DOCUMENTS

| 4,104,225 | A | * | 8/1978 | Conbere | 524/417 |
| 4,822,058 | A | | 4/1989 | Butler et al. | |
| 4,997,684 | A | * | 3/1991 | Franz et al. | 427/384 |
| 5,308,705 | A | * | 5/1994 | Franz et al. | 428/421 |
| 5,763,068 | A | | 6/1998 | Kishino et al. | |
| 6,124,403 | A | | 9/2000 | Crompton, Jr. et al. | |
| 6,830,808 | B2 | | 12/2004 | Iwamoto et al. | |
| 2002/0034589 | A1 | | 3/2002 | Tarney et al. | |
| 2006/0251820 | A1 | * | 11/2006 | Wheland et al. | 427/407.1 |

FOREIGN PATENT DOCUMENTS

JP   01-304936   * 12/1989
JP   2000-212547  *  8/2000

OTHER PUBLICATIONS

Processing Recommendations for DuPont DryFilm RA/W Dispersions, DuPont DryFilm Performance Dispersions, Sep. 2002, H-58531-1.
DuPont DryFilm RA Dispersions, DuPont DryFilm Performance Lubricants, Jul. 2003, H-97551-2.
Patent Abstracts of Japan—Japanese Patent Application 01-304936, published Dec. 8, 1989.
Patent Abstracts of Japan—Japanese Patent Application 2000-212547, published Aug. 2, 2000.

* cited by examiner

*Primary Examiner* — Peter D. Mulcahy
*Assistant Examiner* — Henry Hu

(57) ABSTRACT

Cured perfluoroelastomer articles are disclosed which have improved surface characteristics. The articles are coated with a thin durable film comprising a fluorocarbon telomer which reduces surface stickiness, while maintaining the sealing properties of the article.

6 Claims, No Drawings

PERFLUOROELASTOMER ARTICLES HAVING GOOD SURFACE PROPERTIES

CROSS-REFERENCE TO RELATED APPLICATIONS

This application is a division of application Ser. No. 11/208,187 filed Aug. 19, 2005 and claims the benefit of U.S. Provisional Application No. 60/607,103 filed Sep. 3, 2004.

FIELD OF THE INVENTION

This invention relates to perfluoroelastomer articles for use as vacuum seals in high temperature environments, said articles having good surface lubricity. More specifically, this invention relates to cured perfluoroelastomer articles coated with a thin film of a composition comprising a fluorocarbon telomer having a weight average molecular weight between 1000 and 10000.

BACKGROUND OF THE INVENTION

Perfluoroelastomers have achieved outstanding commercial success and are used in a wide variety of applications in which severe environments are encountered, in particular those end uses where exposure to high temperatures and aggressive chemicals occurs. For example, these polymers are often used in seals for aircraft engines, in oil-well drilling devices, and in sealing elements for industrial equipment used at high temperatures.

The outstanding properties of perfluoroelastomers are largely attributable to the stability and inertness of the copolymerized perfluorinated monomer units that make up the major portion of the polymer backbones in these compositions. Such monomers include tetrafluoroethylene and perfluorinated vinyl ethers. In order to develop elastomeric properties fully, perfluoroelastomers are typically crosslinked, i.e. vulcanized. To this end, a small amount of cure site monomer is copolymerized with the perfluorinated monomer units. Cure site monomers containing at least one nitrile group, for example perfluoro-8-cyano-5-methyl-3,6-dioxa-1-octene, are especially preferred. Such compositions are described in U.S. Pat. Nos. 4,281,092; 4,394,489; 5,789,489; and 5,789,509.

In certain end use applications, a cured perfluoroelastomer article may undesirably adhere to the surface of other materials that are in contact with it, particularly if the perfluoroelastomer article and other material are forcibly held in contact for a long period of time at elevated pressures and temperatures, and then cooled. It may be difficult, or impossible, to easily remove the perfluoroelastomer article from contact with the other material without damaging the perfluoroelastomer article, other material, or both. Also, the perfluoroelastomer article may be undesirably pulled from the groove in which it is seated when the article is being separated from a surface to which it has adhered. Thus, there is a need for perfluoroelastomer articles that have an improved, less sticky surface.

Kishino et al. (U.S. Pat. No. 5,763,068) disclose fluororesin-coated fluoroelastomer articles. In contrast to perfluoroelastomers, fluoroelastomers contain copolymerized units of at least one monomer which is either partially fluorinated (such as vinylidene fluoride), or non-fluorinated (such as propylene). The articles are made by first blending uncured fluoroelastomer with up to 50 parts fluororesin; shaping the blend into an article and curing it; coating the cured article with an aqueous fluororesin dispersion; drying the coated article; and finally heating the article above the melting point of the fluororesin in order to form a durable fluororesin film coating. However, blending a high level of fluororesin with a fluoroelastomer or perfluoroelastomer typically reduces the physical properties of cured articles produced from such blends, especially if the articles are used in a high temperature environment. Compression set resistance and elongation are particularly adversely effected. Heating fluoroelastomer articles to a temperature of about 300° C. or higher, in order to melt the fluororesin, may further degrade the physical properties of the articles.

Tarney et al. (WO 02/20650) disclose fluoropolymer coated perfluoroelastomer articles which have good physical properties and a low stick surface. However, in demanding applications which require excellent high vacuum sealing performance, Tarney's articles may leak due to the nature of the surface coating.

EP 1403348 A1 discloses perfluoroelastomer parts which are coated with a thin film of a polysiloxane-urethane oligomer. Such parts have both a low stick surface and good sealing performance at moderate operating temperatures. However, at operating temperatures above about 250° C., the surface becomes sticky.

Thus, there is a need for perfluoroelastomer articles that have an improved, less sticky surface at operating temperatures above 250° C. and which have excellent sealing performance in high vacuum applications such as in some semiconductor manufacturing equipment.

SUMMARY OF THE INVENTION

An aspect of this invention is a cured perfluoroelastomer article having a surface coated with a film comprising a fluorocarbon telomer having a weight average molecular weight between 1000 and 10000.

Another aspect of this invention is a process comprising:
A. coating a cured perfluoroelastomer article with a dispersion comprising i) a fluorocarbon telomer having a weight average molecular weight between 1000 and 10000 to for a wet-coated perfluoroelastomer article;
B. drying said wet-coated perfluoroelastomer article to form a dry-coated perfluoroelastomer article at a temperature below 200° C.; and
C. heating said dry-coated perfluoroelastomer article to a temperature and for a sufficient period of time whereby said fluorocarbon telomer melts and forms a film on said perfluoroelastomer article.

DETAILED DESCRIPTION OF THE INVENTION

Perfluoroelastomers are polymeric compositions having copolymerized units of at least two principal perfluorinated monomers. Generally, one of the principal comonomers is a perfluoroolefin while the other is a perfluorovinyl ether. Representative perfluorinated olefins include tetrafluoroethylene and hexafluoropropylene. Suitable perfluorinated vinyl ethers include those of the formula $$CF_2=CFO(R_{f'}O)_n(R_{f''}O)_mR_f \qquad (I)$$

where $R_{f'}$ and $R_{f''}$ are different linear or branched perfluoroalkylene groups of 2-6 carbon atoms, m and n are independently 0-10, and
$R_f$ is a perfluoroalkyl group of 1-6 carbon atoms.

A preferred class of perfluorinated vinyl ethers includes compositions of the formula $$CF_2=CFO(CF_2CFXO)_nR_f \qquad (II)$$

where X is F or $CF_3$, n is 0-5, and $R_f$ is a perfluoroalkyl group of 1-6 carbon atoms.

Most preferred perfluorinated vinyl ethers are those wherein n is 0 or 1 and $R_f$ contains 1-3 carbon atoms. Examples of such perfluorinated ethers include perfluoro(methyl vinyl) ether and perfluoro(propyl vinyl) ether. Other useful monomers include compounds of the formula

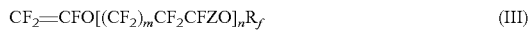

$$CF_2\!=\!CFO[(CF_2)_mCF_2CFZO]_nR_f \qquad\text{(III)}$$

where $R_f$ is a perfluoroalkyl group having 1-6 carbon atoms, m=0 or 1, n=0-5, and Z=F or $CF_3$.

Preferred members of this class are those in which $R_f$ is $C_3F_7$, m=0, and n=1. Additional perfluorinated vinyl ether monomers include compounds of the formula

$$CF_2\!=\!CFO[(CF_2CFCF_3O)_n(CF_2CF_2CF_2O)_m(CF_2)_p]\\C_xF_{2x+1} \qquad\text{(IV)}$$

where m and n=1-10, p=0-3, and x=1-5.

Preferred members of this class include compounds where n=0-1, m=0-1, and x=1.

Additional examples of useful perfluorinated vinyl ethers include

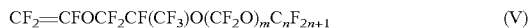

$$CF_2\!=\!CFOCF_2CF(CF_3)O(CF_2O)_mC_nF_{2n+1} \qquad\text{(V)}$$

where n=1-5, m=1-3, and where, preferably, n=1.

Preferred perfluoroelastomer copolymers are comprised of tetrafluoroethylene and at least one perfluorinated vinyl ether as principal monomer units. In such copolymers, the copolymerized perfluorinated vinyl ether units constitute from about 15-50 mole percent of total monomer units in the polymer.

The perfluoroelastomer further contains copolymerized units of at least one cure site monomer, generally in amounts of from 0.1-5 mole percent. The range is preferably between 0.3-1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful nitrile-containing cure site monomers include those of the formulas shown below.

$$CF_2\!=\!CF\!-\!O(CF_2)_n\!-\!CN \qquad\text{(VI)}$$

where n=2-12, preferably 2-6;

$$CF_2\!=\!CF\!-\!O[CF_2\!-\!CFCF_3\!-\!O]_n\!-\!CF_2\!-\!CFCF_3\!-\!\\CN \qquad\text{(VII)}$$

where n=0-4, preferably 0-2; and $$CF_2\!=\!CF\!-\![OCF_2CFCF_3]_x\!-\!O\!-\!(CF_2)_n\!-\!CN \qquad\text{(VIII)}$$

where x=1-2, and n=1-4.

Those of formula (VIII) are preferred. Especially preferred cure site monomers are perfluorinated polyethers having a nitrile group and a trifluorovinyl ether group. A most preferred cure site monomer is $$CF_2\!=\!CFOCF_2CF(CF_3)OCF_2CF_2CN \qquad\text{(IX)}$$

i.e. perfluoro(8-cyano-5-methyl-3,6-dioxa-1-octene) or 8-CNVE.

Other cure site monomers include olefins represented by the formula $R_1CH\!=\!CR_2R_3$, wherein $R_1$ and $R_2$ are independently selected from hydrogen and fluorine and $R_3$ is independently selected from hydrogen, fluorine, alkyl, and perfluoroalkyl. The perfluoroalkyl group may contain up to about 12 carbon atoms. However, perfluoroalkyl groups of up to 4 carbon atoms are preferred. In addition, the cure site monomer preferably has no more than three hydrogen atoms. Examples of such olefins include ethylene, vinylidene fluoride, vinyl fluoride, trifluoroethylene, 1-hydropentafluoropropene, and 2-hydropentafluoropropene, as well as brominated olefins such as 4-bromo-3,3,4,4-tetrafluorobutene-1 and bromotrifluoroethylene. Alternatively, or in addition to copolymerized units of cure site monomers, cure sites of bromine or iodine-containing end groups may be introduced onto the perfluoroelastomer polymer chain by the reaction of bromine or iodine-containing chain transfer agents during polymerization.

Another type of cure site monomer which may be incorporated in the perfluoroelastomers employed in this invention is perfluoro(2-phenoxypropyl vinyl ether) and related monomers as disclosed in U.S. Pat. No. 3,467,638.

An especially preferred perfluoroelastomer contains 53.0-79.6 mole percent tetrafluoroethylene, 20.0-46.6 mole percent perfluoro(methyl vinyl) ether and 0.4 to 1.5 mole percent nitrile-containing cure site monomer.

When the perfluoroelastomer has copolymerized units of a nitrile-containing cure site monomer, a cure system based on an organotin compound can be utilized. Suitable organotin compounds include allyl-, propargyl-, triphenyl- and allenyl tin curatives. Tetraalkyltin compounds or tetraaryltin compounds are the preferred curing agents for use in conjunction with nitrile-substituted cure sites. The amount of curing agent employed will necessarily depend on the degree of crosslinking desired in the final product as well as the type and concentration of reactive moieties in the perfluoroelastomer. In general, about 0.5-10 parts by weight per 100 parts elastomer (phr) of curing agent can be used, and 1-4 phr is satisfactory for most purposes. It is believed that the nitrile groups trimerize to form s-triazine rings in the presence of curing agents such as organotin, thereby crosslinking the perfluoroelastomer. The crosslinks are thermally stable, even at temperatures of 275° C. and above.

A preferred cure system, useful for perfluoroelastomers containing nitrile-containing cure sites, utilizes bis(aminophenols) and bis(aminothiophenols) of the formulas

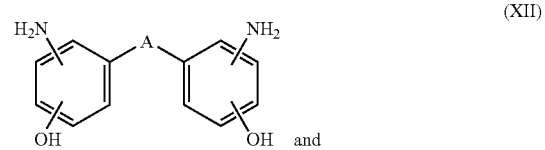 (XII)

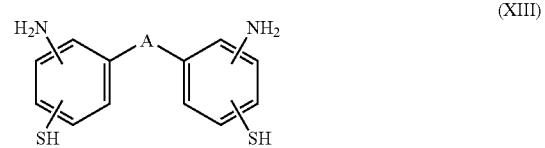 (XIII)

and tetraamines of the formula

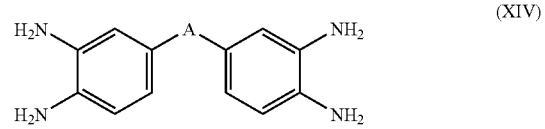 (XIV)

where A is $SO_2$, O, CO, alkylene of 1-6 carbon atoms, perfluoroalkylene of 1-10 carbon atoms, or a carbon-carbon bond linking the two aromatic rings. The amino and hydroxyl or thio groups in formulas XII and XIII above are adjacent to each other on the benzene rings and are interchangeably in the meta and para positions with respect to the group A. Preferably, the curing agent is a compound selected from the group consisting of 4,4'-[2,2,2-trifluoro-1-(trifluoromethyl)ethylidene]bis(2-aminophenol); 4,4'-sulfonylbis(2-aminophenol); 3,3'-diaminobenzidine; and 3,3',4,4'-tetraaminobenzophenone. The first of these is the most preferred and will be referred to as bis(aminophenol) AF. The curing agents can be prepared as disclosed in U.S. Pat. No. 3,332,907 to Angelo. Bis(aminophenol) AF can be prepared by nitration of 4,4'-[2,2,2-trifluoro-1-(trifluoromethyl)ethylidene]-bisphenol (i.e. bisphenol AF), preferably with potassium nitrate and trifluoroacetic acid, followed by catalytic hydrogenation, preferably with ethanol as a solvent and a catalytic amount of palladium on carbon as catalyst. The level of curing agent should be chosen to optimize the desired properties of the vulcanizate. In general, a slight excess of curing agent over the amount required to react with all the cure sites present in the perfluoroelastomer is used. Typically, 0.5-5.0 parts by weight of the curative per 100 parts of elastomer is required. The preferred range is 1.0-2.0 phr.

Peroxides may also be utilized as curing agents, particularly when the cures site is a nitrile group or an iodine or bromine group. Useful peroxides are those which generate free radicals at curing temperatures. A dialkyl peroxide or a bis(dialkyl peroxide) which decomposes at a temperature above 50° C. is especially preferred. In many cases it is preferred to use a ditertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, and di[1,3-dimethyl-3-(t-butylperoxy)butyl]carbonate. Generally, about 1-3 parts of peroxide per 100 parts of perfluoroelastomer is used. Another material which is usually blended with the composition as a part of the peroxide curative system is a coagent composed of a polyunsaturated compound which is capable of cooperating with the peroxide to provide a useful cure. These coagents can be added in an amount between 0.1 and 10 parts per 100 parts perfluoroelastomer, preferably between 2-5 phr. The coagent may be one or more of the following compounds: triallyl cyanurate; triallyl isocyanurate; tri(methylallyl)isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate.

Other curatives suitable for vulcanizing perfluoroelastomers having nitrile cure sites include ammonia, the ammonium salts of inorganic or organic acids (e.g. ammonium perfluorooctanoate) as disclosed in U.S. Pat. No. 5,565,512, and compounds (e.g. urea) which decompose to produce ammonia as disclosed in U.S. Pat. No. 6,281,296 B1.

Depending on the cure site monomers present, it is also possible to use a dual cure system. For example, perfluoroelastomers having copolymerized units of nitrile-containing cure site monomers can be cured using a curative comprising a mixture of a peroxide in combination with an organotin curative and a coagent. Generally, 0.3-5 parts of peroxide, 0.3-5 parts of coagent, and 0.1-10 parts of organotin curative are utilized.

Additives, such as fillers (e.g. carbon black, barium sulfate, silica, aluminum oxide, aluminum silicate, and titanium dioxide), stabilizers, plasticizers, lubricants, and processing aids typically utilized in perfluoroelastomer compounding can be incorporated into the compositions of the present invention, provided they have adequate stability for the intended service conditions.

Cured (i.e. vulcanized or crosslinked) perfluoroelastomer articles employed in this invention are made by shaping and then crosslinking the above perfluoroelastomer compositions. Curing may be induced by heat or by radiation. The article may subsequently be post cured at elevated temperatures for a period of time.

After extensive research, a polymeric coating composition has been found that provides perfluoroelastomer articles with both low surface stickiness and good sealing properties when used at operating temperatures in the region of 250° C. to 330° C. The durable films which coat the perfluoroelastomer articles employed in this invention are comprised of fluorocarbon telomers having a weight average molecular weight between 1000 and 10000, preferably between 2000 and 4000. Such telomers typically have a peak softening point between 290° C. and 310° C. Examples of fluorocarbon telomers that may be employed in this invention include, but are not limited to polytetrafluoroethylene (PTFE), and copolymers of tetrafluoroethylene such as PFA and FEP. PTFE is preferred.

In the process of this invention, the uncured fluorocarbon telomer is applied as a dispersion to a cured perfluoroelastomer article. Liquids, including water and organic solvents, may be used to form the dispersion. The dispersion typically comprises between 1 and 20 weight percent fluorocarbon telomer, based on the total weight of the dispersion. The dispersion may also contain minor amounts of other ingredients such as surfactants, pH buffers, etc. Commercially available telomer dispersions are available under the trade names DuPont™ DryFilm performance dispersions, Daikin Lubron PTFE lubricants, and Central Glass Cefral Coat.

The cured, perfluoroelastomer article may be coated with fluorocarbon telomer dispersion by any means commonly employed in the art such as by dipping, spray coating, or by contacting with an applicator. Coating thickness is typically 0.1 to 20 microns, preferably 3 to 10 microns. Generally, the thicker the coating, the less sticky the resulting perfluoroelastomer article. However, as the coating thickness increases, the article's ability to form a good (i.e. non-leaking) seal decreases, so the two properties must be balanced for a particular end use application.

The wet-coated article thus produced is then dried to remove most of the liquid. Drying may be done at any temperature less than the temperature where the fluorocarbon telomer melts. Care must be taken not to dry the coating too quickly. Otherwise, bubbles may form in the coating, which when burst, may result in large non-coated areas on the surface of the article. Typically, drying is done in air at room temperature (20° C.-25° C.).

The dry-coated article thus produced is then heated to a temperature where the fluorocarbon telomer melts and forms a film. Typically, this will be at a temperature between 290° C. and 320° C. for more than 5 minutes. One skilled in the art will recognize that this heating step must be controlled so that the coated part is not subjected to a high temperature for a time sufficient to cause unacceptable thermal degradation to the telomer film or to the perfluoroelastomer article. The maximum temperature and exposure time depends on the particular fluorocarbon telomer and perfluoroelastomer article. It is not necessary that the resulting film be a continuous film of uniform thickness in order for the resulting perfluoroelastomer article to have a greatly improved surface with little or no stickiness. The physical properties of the film-coated articles of this invention have comparable physical properties to non-coated perfluoroelastomer articles.

To improve the durability (i.e. adhesion) of the film onto the surface of a cured perfluoroelastomer article, the surface of the article may preferably be pre-treated, i.e. prior to application of the dispersion, to increase surface area. Examples of suitable surface treatments for use in this invention include, but are not limited to roll flow, sanding, grinding, and plasma or chemical etching. Roll flow refers to a process wherein a cured perfluoroelastomer article and abrasive particles are agitated in a container for a period of time in order to increase the surface area of the article via introduction of microscopic pits, cracks and the like onto the surface. Sanding and plasma or chemical etching increases the article's surface area by similar means. Preferably, the surface is also cleaned with an appropriate solvent to remove contaminants such as mold release agents, lubricants, oils, etc.

The fluorocarbon telomer film coated perfluoroelastomer articles of this invention are useful in many end use applications such as those involving high temperatures (i.e. 250° C. to 330° C.), high vacuums (i.e. pressures of $0.1\text{-}10^{-5}$ Pa) and harsh chemical or plasma environments wherein it is undesirable for the perfluoroelastomer articles to stick to the surfaces of materials with which the articles are in contact. Examples of such end use applications include semiconductor manufacturing equipment and the chemical process industry.

EXAMPLES

Test Method

Sticking Force

Stickiness was measured on type AS-214 o-rings. An o-ring was compressed 25% in a jig between two stainless steel plates. The jig was then placed in an air oven for 16 hours at 300° C. Afterwards, the jig was removed from the oven and allowed to cool at room temperature for 3 hours. The plates were then attached to an Instron and the force required to pull the plates apart was measured. A sticking force less than 150 N was acceptable and greater than 150 N unacceptable.

Helium Leak Test

A film-coated type AS-214 o-ring was used in a jig to form a seal between a chamber fillable with helium and a chamber under vacuum. The o-ring was compressed 25%. The vacuum chamber was connected to a ULVAC HELIOT 301 Helium Leak Detector. The test was run by measuring the elapsed time between when helium was introduced into the helium chamber and when it was detected at the rate of at least $10^{-10}$ Pa m$^3$/sec by the He detector. An elapsed time of greater than 30 seconds was acceptable, between 30 seconds and 15 seconds marginal, and less than 15 seconds, unacceptable.

Example 1

The cured perfluoroelastomer articles employed in this Example were type AS-214 o-rings made from a perfluoroelastomer comprising copolymerized units of tetrafluoroethylene, perfluoro(methyl vinyl)ether and perfluoro(8-cyano-5-methyl-3,6-dioxa-1-octene). In addition to perfluoroelastomer, o-rings contained 6.5 phr TiO$_2$ and 3 phr SiO$_2$.

O-rings were spray coated with DuPont™ Teflon® finish 851 K-02730, a dispersion (5.5 weight percent solids in DuPont™ Vertrel® HFC 43-10 solvent) of polytetrafluoroethylene having a weight average molecular weight of 3000. The coated o-rings were dried in air at room temperature for a few minutes. These dry-coated o-rings were then baked in an air oven at 310° C. for 10 minutes to yield fluorocarbon telomer film-coated perfluoroelastomer articles of this invention. The coated o-rings were washed with water. Film thickness was 5 microns.

Comparative coated o-rings were made by the same procedure, except either DuPont™ DryFilm 2000 (weight average molecular weight of 40,000) or an FEP (weight average molecular weight of 100,000) was used in place of the Teflon® 851 K-02730.

Sticking force of the film-coated perfluoroelastomer o-rings was measured according to the Test Method. The results for the film coated o-rings of the invention averaged 120 N for 3 o-rings tested. Comparative o-rings coated with the DryFilm 2000 had a sticking force of 200 N and comparative o-rings coated with FEP had a sticking force of 510N. The sticking force of a control (i.e. not coated) perfluoroelastomer o-ring was measured as 275 N.

The sealing ability of three other film-coated o-rings of the invention prepared above was measured by the He leak test method. The average elapsed time was 60 seconds. Comparative o-rings coated with the DryFilm 2000 had an elapsed time of 60 seconds and comparative o-rings coated with FEP had an elapsed time of 0 seconds. The elapsed time of a control (i.e. not coated) perfluoroelastomer o-ring was 60 seconds.

What is claimed is:

1. A cured perfluoroelastomer article for use as a vacuum seal in a high temperature environment, said article having at least a portion of a surface coated with a film having a thickness between 0.1 and 20 microns, said film consisting of a fluorocarbon telomer selected from the group consisting of polytetrafluoroethylene, tetrafluoroethylene/perfluoroalkoxy copolymer (PFA) and fluorinated ethylene/propylene copolymer (FEP), said fluorocarbon telomer having a weight average molecular weight between 1000 and 10000.

2. A cured perfluoroelastomer article of claim 1 wherein said perfluoroelastomer comprises copolymerized units of tetrafluoroethylene, a perfluorinated vinyl ether and a cure site monomer.

3. A cured perfluoroelastomer article of claim 2 wherein said perfluoroelastomer comprises copolymerized units of 53.0-79.6 mole percent tetrafluoroethylene, 20.0-46.6 mole percent perfluoro(methyl vinyl ether) and 0.4-1.5 mole percent nitrile-containing cure site monomer.

4. A cured perfluoroelastomer article of claim 1 wherein said fluorocarbon telomer is polytetrafluoroethylene.

5. A cured perfluoroelastomer article of claim 1 wherein said fluorocarbon telomer has a weight average molecular weight between 2000 and 4000.

6. A cured perfluoroelastomer article of claim 1 wherein said film has a thickness between 3 and 10 microns.

* * * * *